United States Patent
Okubo et al.

(10) Patent No.: US 6,468,180 B1
(45) Date of Patent: Oct. 22, 2002

(54) TOROIDAL TYPE CONTINUOUSLY VARIABLE TRANSMISSION AND METHOD OF MANUFACTURING DISK FOR TOROIDAL TYPE CONTINUOUSLY VARIABLE TRANSMISSION

(75) Inventors: Kiyoshi Okubo, Maebashi; Nobuo Gotou; Takashi Imanishi, both of Fujisawa; Takehiko Yumoto, Takasaki, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/228,256

(22) Filed: Jan. 11, 1999

(30) Foreign Application Priority Data

Jan. 13, 1998 (JP) .............................................. 10-004914

(51) Int. Cl.⁷ ............................................. F16H 15/38
(52) U.S. Cl. ........................................ 476/40; 476/73
(58) Field of Search .............................. 476/40, 42, 73; 29/893.34; 72/360

(56) References Cited

U.S. PATENT DOCUMENTS 5,735,769 A * 4/1998 Takemura et al. ............ 476/40
5,976,053 A * 11/1999 Kino et al. ................... 473/73
6,113,514 A    9/2000 Okubo et al.

FOREIGN PATENT DOCUMENTS

DE  19644967 A1   5/1997
DE  19860518 A1  12/1999
JP  9-126289    *  5/1997

OTHER PUBLICATIONS

Office Action mailed Aug. 8, 2001, in counterpart German Patent App. No. 199 00 838.8–12; includes full English translation.

* cited by examiner

Primary Examiner—William C Joyce
(74) Attorney, Agent, or Firm—Christensen O'Connor Johnson Kindness PLLC

(57) ABSTRACT

A disk for a half toroidal type continuously variable transmission is manufactured through the following processes. In step S1, a work as a base material mass is heated to a temperature suitable for forging. In step S2, the work is forged into the work having a portion corresponding to a protrusion of the disk using a first die set. In step S3, the work is forged into the work which has a hole corresponding to a mounting hole of the disk using a second die set. In step S4, the work is forged into the work which has a portion corresponding to a skirt portion of the disk using a third die set. In step S5, the work receives punching, machining and the like to finally obtain the disk product.

4 Claims, 8 Drawing Sheets

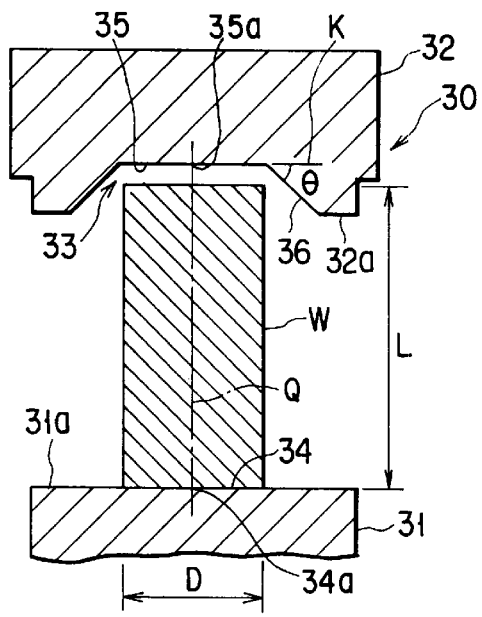
FIG. 4A
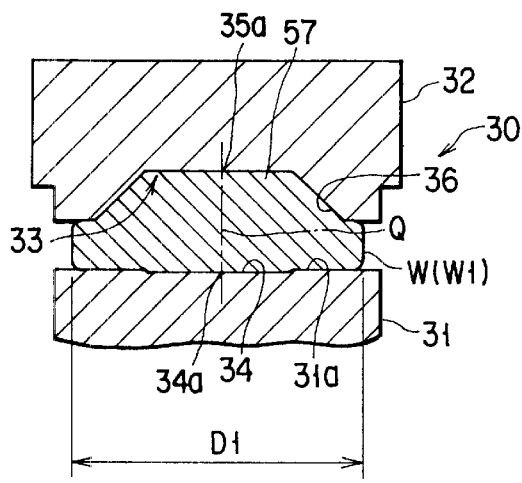
FIG. 4B
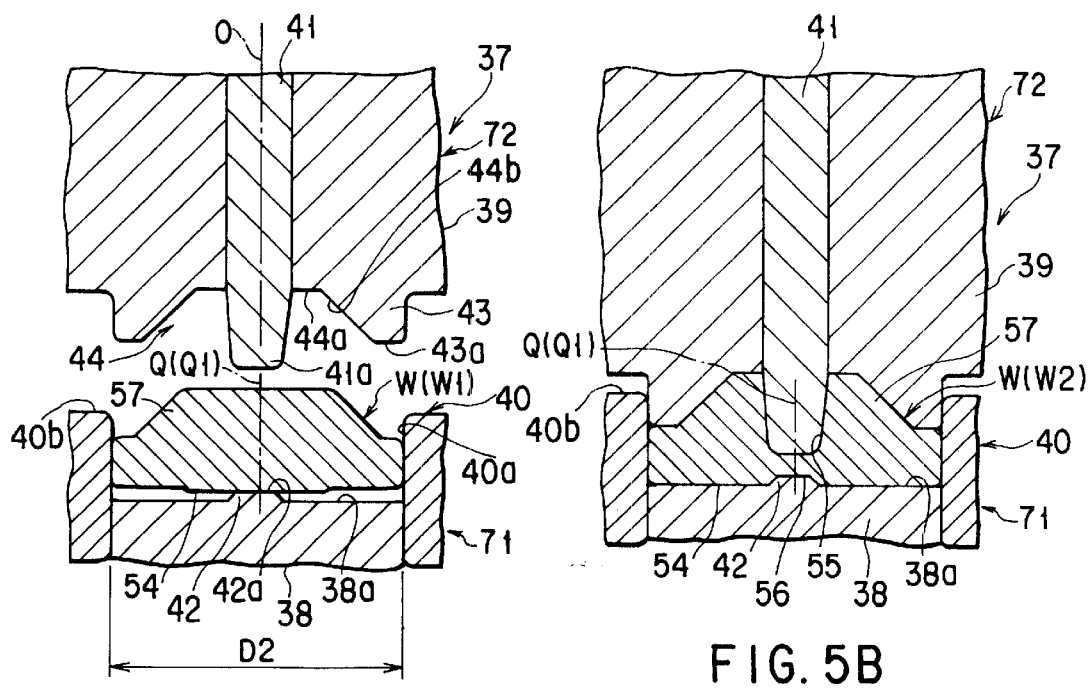
FIG. 5A
FIG. 5B

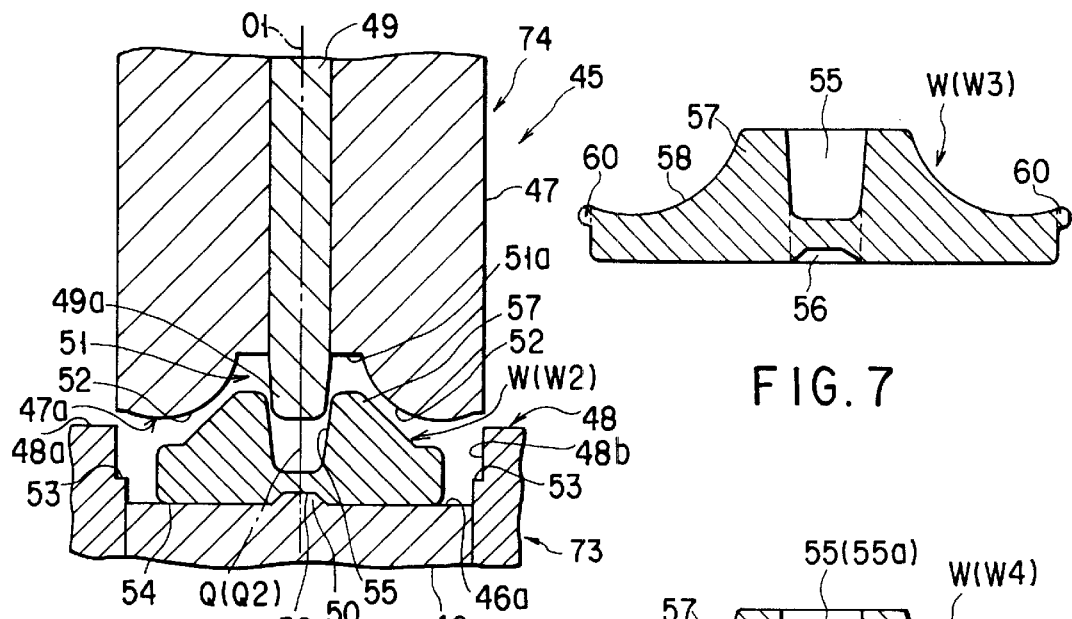
FIG. 6A
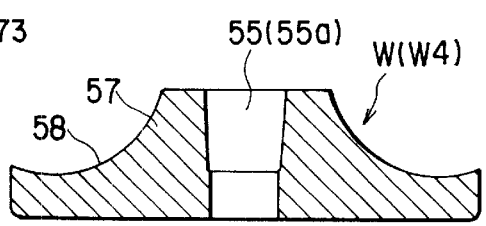
FIG. 7
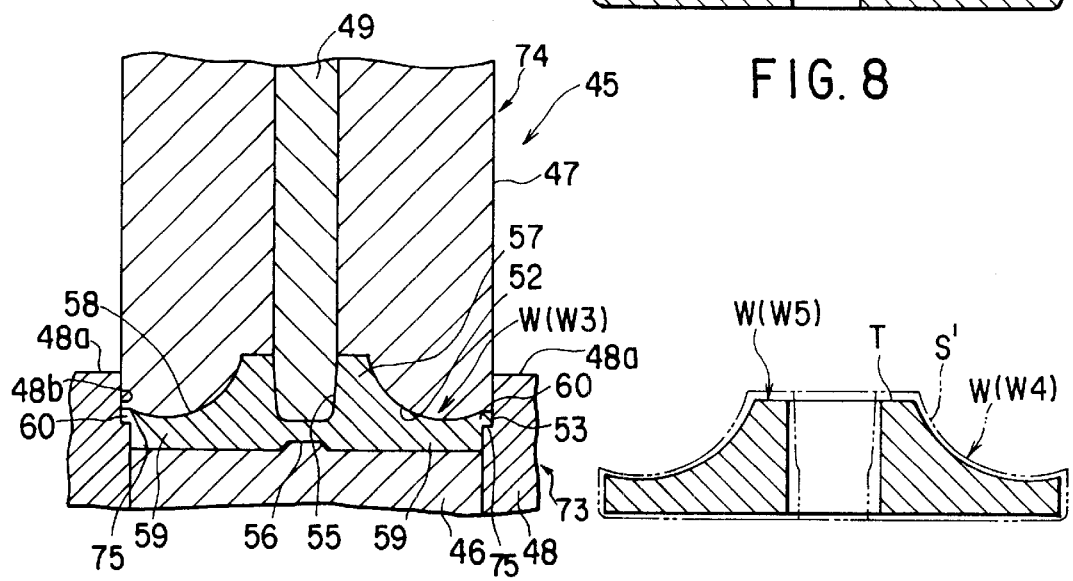
FIG. 6B
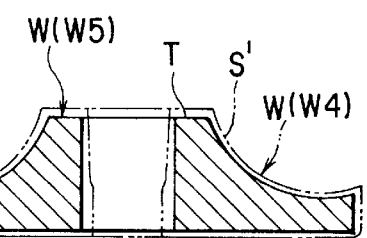
FIG. 8
FIG. 9

TOROIDAL TYPE CONTINUOUSLY VARIABLE TRANSMISSION AND METHOD OF MANUFACTURING DISK FOR TOROIDAL TYPE CONTINUOUSLY VARIABLE TRANSMISSION

BACKGROUND OF THE INVENTION

The present invention relates to a toroidal type continuously variable transmission used as a transmission for vehicles such as automobiles and particularly, to a method of manufacturing a disk for a toroidal type continuously variable transmission.

Heretofore, speed change gears have mainly been used as transmissions for vehicles such as automobiles. The speed change gears comprises a plurality of gears, and the engagement mode of the gears is varied to transmit torque from an input shaft to an output shaft. However, in the conventional speed change gears, torque is varied stepwise and discontinuously at the time of changing the speed. Thus, the speed change gears have drawbacks such as a loss in power transmission and vibration at the time of changing the speed.

Under the circumstances, a continuously variable transmission, in which torque is not varied stepwise or discontinuously at the time of changing the speed, has recently been put to practical use. In the continuously variable transmission, no vibration occurs at the time of changing the speed, and the loss in power transmission is less than that in the speed change gears. In addition, the continuously variable transmission is fuel-efficient when it is mounted in the vehicle. As an example of the continuously variable transmission, a belt type continuously variable transmission is mounted in some type of passenger cars.

On the other hand, as an another example of the continuously variable transmission, a toroidal type continuously variable transmission has been proposed. The toroidal type continuously variable transmission comprises an input shaft rotated by a drive source such as an engine, an input disk, an output disk and power rollers. The input disk is supported on the input shaft and rotated in interlock with the input shaft. The output disk is supported on the input shaft so as to be opposed to the input disk and rotated in interlock with the output shaft. The power roller is provided swingably between the input disk and the output disk and rotatably put into contact with both disks.

The input disk and the output disk have essentially equivalent shapes to each other. One disk 80 of the input disk and the output disk will below be described in reference to FIG. 17.

The disk 80 has the shape of a disk symmetrical with respect to an axis P1. The disk 80 comprises a protrusion 81, a skirt portion 82 and a mounting hole 83 in one body. The protrusion 81 is projected in the central portion of the disk 80 along the axis P1 as viewed from the side. The skirt portion 82 is provided outside an outer periphery of the protrusion 81 and a thickness of the disk is gradually thinner along a direction from the protrusion 81 toward its outer edge. The mounting hole 83 penetrates through the protrusion 81 along the axis Pl. The mounting hole 83 accommodates the input shaft inside the hole when the disk 80 is mounted on the input shaft.

The disk 80 is provided with a traction surface 85 over the protrusion 81 and the skirt portion 82. The traction surface 85 is formed in the sectional shape of an arc whose center coincides with the axis P1 of a shaft which supports the power roller in a freely swingable manner. The traction surface 85 is formed along all the periphery of the disk 80.

The toroidal type continuously variable transmission can transmit higher torque as compared with the belt type continuously variable transmission. For this reason, it is considered that the toroidal type continuously variable transmission is effective for continuously variable transmissions for middle and large sized vehicles.

However, the toroidal type continuously variable transmission requires transmission of larger torque. For this reason, the disk 80 and the power roller receive a very large repeated bending stress and a very large repeated shearing stress as compared with general mechanical parts on which a repeated stress acts such as a gear and a bearing. Especially, the disk 80 receives a large stress on an end surface 81a of the protrusion 81.

As a method of manufacturing a disk 80 for the toroidal type continuously variable transmission, for example, a method in which a work formed in a rod shape by a rolling process is subjected to machining or a method which has been disclosed in Jpn. Pat. Appln. Publication No. 9-126289 has been employed. The method shown in Jpn. Pat. Appln. Publication No. 9-126289 is that a work as an to-be-molded object is subjected to forging so to be fashioned into a near final shape and thereafter grinding is performed on the work as a finishing process.

When the above described disk is manufactured by machining a rod-like metal base material mass, a yield is low due to machining loss and a required time for the process is long. Hence, a problem arises that a production cost is increased.

Furthermore, a base material mass used for a disk that has been formed into a rod-like shape through processes such as melting, casting, and rolling, includes most of the disk's impurities in an area defined by a diameter that is 30% or less of the outer diameter of the base material. The increased concentration of impurities in the center of the disk is due to the central portion of the disk cooling at a slower rate than the outer portion of the disk. Moreover, a metal flow, which is a flow of metal structure formed in the process of rolling or the like, is formed along the axis of the base material mass.

When the mass, which contains much of impurities around the central portion, is subjected to machining to manufacture the disk 80, much of impurities are present in a densely hatched portion X1 of FIG. 17 in the vicinity of the inner surface 83a of the mounting hole 83 from the bottom surface 84 to the end surface 81a of the protrusion 81. Besides, metal flows J are formed along the axis P1 of the disk 80.

For this reason, the disk 80 manufactured by machining is apt to fracture in the portion X1 which includes a lot of impurities along the metal flow lines J since a great stress acts especially on the end surface 81a of the protrusion 81 as compared with general mechanical parts. Accordingly, a disk 80 manufactured by machining has had a tendency to have a relatively shorter life span because of higher stresses applied to the end face, which in turn results in a shorter life span of a toroidal type continuously variable transmission.

In the manufacturing method described in the Jpn. Pat. Appln. Publication No. 9-126289, one kind of a die set is used for forging of a work for a disk till an almost final shape is conferred to the work and thereafter, grinding is applied to attain the disk 80. In the manufacturing method, therefore, a time length during which the work is in contact with the die set is long. Hence, the die set is apt to shorten its lifetime because of reduction in a surface hardness under influence of heat in forging.

In addition, since a structure of the die set is not one to support a work in the course of forging, the work is subject to deviate from the center of the die set to have an eccentricity, which causes dimensional precision to be deteriorated. Furthermore, since in the final stage of forging, the work occupies a full space of the die set, a part of the work corresponding to a corner of the die set is subject to underfill or burr, which have again caused shaping of the work into desired dimensions to be difficult.

What's worse, since only one kind of die set is used, a need has arisen that an excessive load is imposed for forging a work in the process in order to mold the work into a desired shape. Hence, there has been a risk that a die set is fractured. In order to suppress a required time length for grinding which is performed after the forging, it is a necessity to decrease a grinding removal. In order to decrease the grinding removal, there is a further necessity to suppress a wear of the die set or the like. For this purpose, in the manufacturing method described in Jpn. Pat. Appln. Publication No. 9-126289, since one kind of die set is used and an excessive load is imposed on a die set in forging, a lifetime of the die set which is used in the forging has had a tendency to be shortened. Accordingly, a tendency to increase a production cost of a disk has arisen.

BRIEF SUMMARY OF THE INVENTION

It is, accordingly, an object of the present invention to provide a toroidal type continuously variable transmission with a disk having a long lifetime and a method of manufacturing the disk for a toroidal type continuously variable transmission whereby not only can the disk having a long lifetime be molded with no shortening of a lifetime of die sets but increase in a production cost of the disk is suppressed.

The present invention, which has been made in order to achieve the object, is directed to a toroidal type continuously variable transmission comprising:

an input shaft rotated by a driving source;
an input disk supported on the input shaft;
an output disk supported on the input shaft and opposed to the input disk;
a power roller swingably provided between the input disk and the output disk and rotatably put in contact with both disks; and
a compression device having a cam disk supported on the input disk,
wherein at least one of the input disk and the output disk is provided with a protrusion projected along an axis thereof in the central portion and a mounting hole penetrating through the protrusion along the axis,
a portion including much of impurities of 30% or less of the outer diameter of the work around the central portion thereof, before manufacturing processes for the at least one disk, does not exist on a part of an inner surface of the mounting hole, which part extends a distance h from end surface of the protrusion and if a thickness of the disk in axial direction thereof is expressed H, the following a relationship is satisfied: $h/H \leq 0.33$.

In the toroidal type continuously variable transmission, the portion which includes much of impurities does not exist on a part of the inner surface of the mounting hole being extended toward an end surface of the protrusion to a position which satisfies the ratio of 0.33 or less. Hence, the toroidal type continuously variable transmission enjoys a long lifetime in use since the disk is prevented from being subjected to fracture at the end surface of the at least one disk.

It is desired that in the toroidal type continuously variable transmission, at least one of the input disk and the output disk is provided with: a protrusion projecting in the central portion along the axis thereof; and a traction surface which is put in contact with the power roller; and an end flow of a metal flow does not exist within the range of 15 to 60 degrees in an angle formed between a line segment V1, V2 between an end of a metal flow on the traction surface and a center of a curvature of the traction surface, and a line V which passes through the center of the curvature in parallel to the axis, respectively.

In the toroidal type continuously variable transmission, the traction surface which is put in contact with the power roller and a relatively large force is acted on does not have an end flow of a metal flow within the angular range of 15 to 60 degrees. Hence, the toroidal type continuously variable transmission is prevented from being fractured at the traction surface of the at least one disk and enjoys a long life time in use.

It is, besides, desired that at least one of the input disk and the output disk is provided with; a protrusion, which has an end surface, and which projects in the central portion thereof along the axis; a bottom surface located on the rear side of the end surface of the protrusion; and a traction surface which is put in contact with the power roller, and end flow of a metal flow on the bottom surface does not exist in the angular range of ±10 degrees of a line segment V3, that perform extensively between a center of a curvature of the traction surface and a contact point at which the power roller is put in contact with the traction surface at the maximum decrease in speed or the maximum increase in speed.

The toroidal type continuously variable transmission does not have end flow of a metal flow on the bottom surface located on the rear side of the end surface in the above described angular range. Hence, the toroidal type continuously variable transmission is prevented from being fractured at the bottom surface of at least one disk and enjoys a long lifetime in use.

The present invention is directed to a method of manufacturing a disk for a toroidal type continuously variable transmission, wherein the disk comprises: a protrusion projected in the central portion along the axis thereof; a skirt portion provided outside the periphery of the protrusion, and whose thickness is gradually thinner along a direction from the protrusion toward its outer edge; a mounting hole penetrating through the protrusion along the axis thereof; and a traction surface which is put in contact with a power roller, characterized in that the method comprises of:
prepare a first cylindrical shaped material with metal flow existing on crosssectional surface thereof and extending along an axial direction thereof;
provide a first lower die comprising:
a first plane portion perpendicular to an axis (Q) of the first material;
a first circular recessed portion being from the first plane portion, having a diameter equal or larger than a diameter of the first material and being concentrical with the first material; and
provide a first upper die comprising:
a second plane portion perpendicular to an axis (Q) of the first material and having a diameter equal or larger than a diameter of the first material;
a second tapered recessed portion located outside of the second plane portion, the second tapered recessed portion decreasing in diameter in an upward direction and being concentrical with the first circular recessed portion of the first lower die and having taper angle (θ) equal to following equation:

θ=δ±10 degrees, wherein the angle δ is formed between an end surface of the protrusion perpendicular to an axis of the disk and connecting line from γ point to β point, the γ point being edge of traction surface of the protrusion, β point on the traction surface being intersected to a horizontal line passed through a center (α) of a curvature of the traction surface and parallel the axis of the disk;

upsetting the first material in the axial direction thereof with the first lower die and the first upper die so as to obtain a second material;

prepare a second lower die comprising:

a third plane portion perpendicular to an axis of the second material;

a first projecting portion being projected from a center of the third plane portion and being concentrical with the second material and;

a first outer portion located outside of the third plane portion, being concentrical with the second material;

prepare a second upper die comprising:

a fourth plane portion perpendicular to an axis of the second material and having a diameter equal the diameter of the second plane portion of the first upper die;

a third tapered recessed portion located outside of the fourth plane portion with same angle to the second tapered recessed portion of the first upper die;

a first inner die projected from a center of the fourth plane portion on concentrical with the second material and being formed in a conical shaped;

first forging the second material in the axial direction thereof with the second lower die and the second upper die so as to obtain a third material;

prepare a third lower die comprising:

a fifth plane portion perpendicular to an axis of the third material;

a second projecting portion being projected from a center of the fifth plane portion and being concentrical with the third material and;

a second outer portion located outside of the fifth plane portion, being concentrical with the third material and having a diameter for manufacturing a finished raw diameter of an outer peripheral surface of the disk;

prepare a third upper die comprising:

a fourth recessed portion for forming raw protrusion perpendicular to an axis of the third material;

a forming raw traction surface located outside of the fourth recessed portion for forming the traction surface of the concave arc shaped cross section and;

a second inner die projected concentrically with the third material and being diameter equal to first inner die;

second forging the third material in the axial direction thereof with the third lower die and the third upper die so as to obtain a fourth material, which the fourth material to finish the disk is obtained.

The method of manufacturing a disk for a toroidal type continuously variable transmission is that in the course in which a disk is molded from base material, portions corresponding to a protrusion, a mounting hole and a skirt portion are respectively molded using the first to third lower and upper dies in a separate manner. Hence, a time in which the work and each of the lower and upper dies stay in contact with each other is shortened and an influence of a work temperature on the lower and upper dies is lessened, which in turn entails a retained surface hardness of each of the lower and upper dies. Accordingly, not only is a chance of decreasing a lifetime of each die set smaller but increase in production cost thereof can be suppressed.

Besides, since the first to third lower and upper dies which are respectively used in the upsetting, the first forging and the second forging processes are separately provided, molding of the work in the respective processes can be performed with no troubles. Hence, flowing of a metal structure of the materials in each process can be effected in a smooth manner and a disk balanced in the flow of a metal structure or the like can be molded. Accordingly, a disk with a relatively long lifetime can be molded.

Besides, as described above, since the flowing of a metal structure of the disk in each of the processes can be effected in a smooth manner, pressures imposed on the lower and upper dies in the respective processes can be suppressed to a low level. Therefore, fracture of the lower and upper dies can be prevented from occurring. Accordingly, a lifetime of each lower and upper die is not shortened and at the same time, decrease in production cost is suppressed.

The first upper die which is used in the upsetting has a second plane portion, which is having a diameter equal or larger than diameter of the first material, and a second tapered recessed portion which is provided with satisfying the above described conditions. An inner profile of the second tapered recessed portion is in conformity with an outer profile of the protrusion of a disk when the second tapered recessed portion satisfies the above described conditions. Hence, a portion corresponding a protrusion of a disk can be molded on the second material by the upsetting process with certainty.

In the first lower die used in the upsetting, a first circular recessed portion which is formed in a withdrawn manner from a first plane portion retains the first material so that the axis of the material is perpendicular to the first plane portion. The center of the first circular recessed portion of the first lower die and the center of the second plane portion of the first upper die are in alignment with the axis of the material. Hence positional deviation such as an eccentricity of the material between the first lower die and the first upper die can be suppressed in upsetting the material. Accordingly, a disk with more of precision can be molded.

The second upper die which used in first forging is provided with the third tapered recessed portion with the same shape as the second tapered recessed portion of the first upper die. Hence, positional deviation such as eccentricity of the material is more suppressed and a disk with more of precision can be molded.

The first inner die has the outer diameter smaller than an inner diameter of a mounting hole. Hence, a portion including much of impurities of 30% or less of the outer diameter of the first material around the central portion thereof can be pushed out from the inner surface of the mounting hole or the like to be removed to nothing. Accordingly, a disk with a long lifetime can be molded.

The outer portion of the second lower die is formed as an annular ring enveloping the outer peripheral surface of the first material. Hence, positional deviation such as an eccentricity of the material is more suppressed and a disk with more of precision can be molded.

The third upper die used in second forging is provided with the forming raw traction surface whose inner profile is in conformity with the protrusion of the disk and the curved surface which is conformity with the traction surface. The second inner die is formed in the same shape as the first inner die. The outer portion of the third lower die is formed as an annular ring enveloping the outer periphery of the material. Hence, positional deviation such as an eccentricity of the material is more suppressed and a disk with more of precision can be molded.

It is desirable that in the upsetting, the first and second forging processes in which the protrusion, the mounting hole and the skirt portion are molded, the disk is molded while both ends of a base material mass is kept in contact with the first to the third lower and upper dies to be restrained by the dies.

The portion of a base material including most of the impurities and occurring in an area defined by a diameter that is 30% or less of the outer diameter of the base material mass. This portion is pushed out from a peripheral portion of the mounting hole, such as the inner surface thereof is mostly void of impurities and the invention can keep the value $h/H \leq 0.33$.

The disk may be manufactured by applying machining or the like after the upsetting, the first and second forging processes. In this case, not only can a disk with more of precision be manufactured but requirements for precision of the first to the third lower and upper dies when the dies are used for molding can be alleviated. Hence, even a die whose wear has been advanced can be kept in use and thereby, a production cost can be suppressed since a die cost is decreased.

It is desired that as a work for manufacturing the disk, a solid base material, which is formed in the shape of a round rod, and which has a flow of a metal structure (a metal flow) along an axial direction of the material is used. Besides, it is desired that when a length of the solid base material mass is L and a diameter thereof is d, L and d satisfy a relation of $L/d \leq 2.2$.

In this case, when a disk is molded through the upsetting, the first and second forging processes, a metal flow is formed in an axial symmetrical relation with respect to the axis of the disk and the disk with a long lifetime can be molded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is sectional views showing a work before a first forging process in manufacturing the disk shown in FIGS. 2A and 2B and a first die set;

FIG. 4B is sectional views showing the work after the first forging process in manufacturing the disk shown in FIGS. 2A and 2B and the first die set;

FIG. 5A is sectional views showing a work before a second forging process in manufacturing the disk shown in FIGS. 2A and 2B and a second die set;

FIG. 5B is sectional views showing the work after the second forging process in manufacturing the disk shown in FIGS. 2A and 2B and the second die set;

FIG. 6A is sectional views showing a work before a third forging process in manufacturing the disk shown in FIGS. 2A and 2B and a third die set;

FIG. 6B is sectional views showing the work after the third forging process in manufacturing the disk shown in FIGS. 2A and 2B and the third die set;

FIG. 7 is a sectional view showing the work after completion of the third forging process shown in FIGS. 6A and 6B;

FIG. 8 is a sectional view showing a state after punching the work shown in FIG. 7;

FIG. 9 is a sectional view showing a state after machining the work shown in FIG. 8;

DETAILED DESCRIPTION OF THE INVENTION

A first embodiment of the present invention will below be described in reference to FIGS. 1 to 9.

Figure 1:
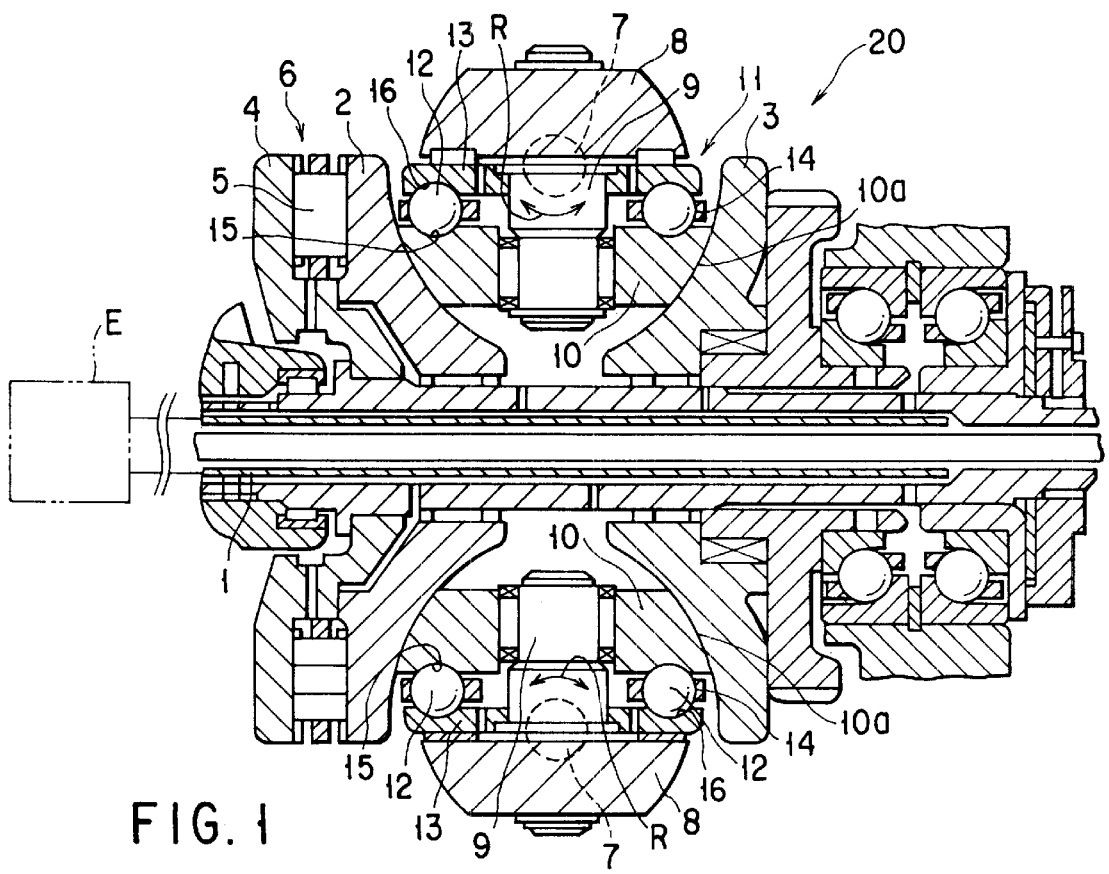
FIG. 1 is a view in longitudinal section showing part of a half toroidal type continuously variable transmission according to a first embodiment of the present invention.

FIG. 1 is a sectional view showing part of a half toroidal type continuously variable transmission 20 as a type of the toroidal type continuously variable transmission. The half toroidal type continuously variable transmission 20 is a device in which power based on rotation of an input shaft 1 connected to a drive source E including an engine is transmitted to an output shaft.

As shown in FIG. 1, the half toroidal type continuously variable transmission 20 comprises an input shaft 1 rotated by a drive source E including an engine or the like, an input disk 2, an output disk 3, a power roller 10 and a compression device 6.

The input disk 2 is supported on the input shaft 1 and rotated in interlock with the input shaft 1. The output disk 3 is supported on the input shaft 1 so as to be opposed to the input shaft 1. The output disk 3 rotates in interlock with an output shaft which derives power based on rotation of the input shaft 1.

The power roller 10 is freely swingably provided between the input disk 2 and the output disk 3 and rotatably put in contact with both disks 2 and 3. The compression device 6 is provided on the rear side of the input disk 2. The compressing device 6 comprises a cam disk 4 and a cam roller 5 provided on the rear side of the input disk 2. The cam disk 4 and the input disk 2 are splined to the input shaft 1 and rotate along with the input shaft 1. The cam roller 5 is provided between the cam disk and the input disk 2. In the compression device 6, the cam roller is rotated to urge the input disk 2 towards the output disk 3.

A trunnion 8 is provided between the input disk 2 and the output disk 3. The trunnion 8 can swing on a shaft 7 in the direction of a double-headed arrow mark R in FIG. 1. A displacement shaft 9 is provided at a central portion of the trunnion 8. The power roller 10 is freely rotatably supported on the displacement shaft 9. The power roller 10 has a traction portion 10a which is rotatably put in contact with the input disk 2 and the output disk 3. The power roller 10 can vary its inclination about the shaft 7 in the direction mark R between the input disk 2 and the output disk 3 in accordance with a speed change ratio between the disks 2 and 3.

A ball thrust bearing 11 functioning as a power roller bearing is provided between the trunnion 8 and the power roller 10. The ball thrust bearing 11 bears a load in a thrust direction applied to the power roller 10 from the input disk 2 and the output disk 3, and permits rotation of the power roller 10. Balls 12 in the ball thrust bearing 11 are retained by an annular retainer 14. The retainer 14 is provided between an annular outer lace 13 formed in the trunnion and the power roller 10 functioning as a rotary portion.

The power roller 10 and the outer race 13 have run grooves 15 and 16, respectively, for retaining the balls 12 in a freely rolling manner and the run grooves 15 and 16 are provided at contact faces between the power roller 10 and the balls 12, and between the outer race 13 and the balls 12. The run grooves 15 and 16 are formed annular and have an arc cross section.

Rotation of the input disk 2 is transmitted to the output disk 3 through a rotational motion of the power roller 10. A large stress arises between the power roller 10 and the disk 2, and the power roller 10 and the disk 3.

Figure 2A:
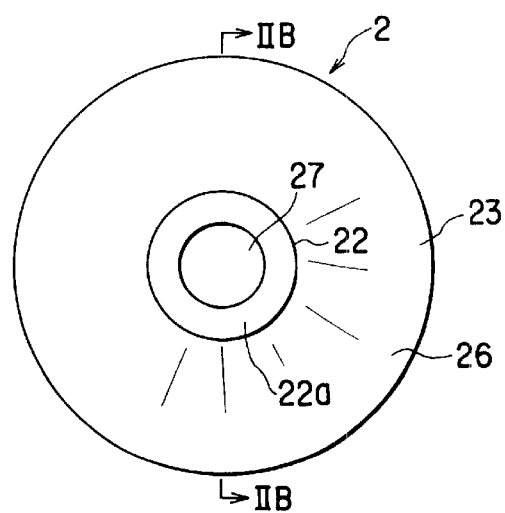
FIG. 2A is a front view of a disk for the half toroidal type continuously variable transmission shown in FIG. 1.
Figure 2B:
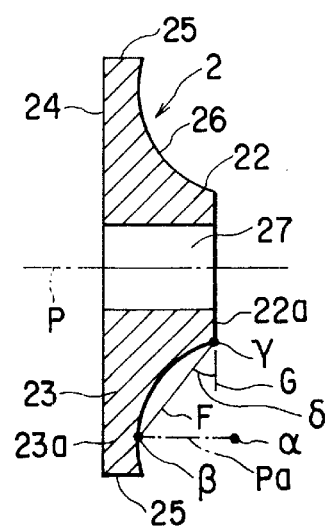
FIG. 2B is sectional view of the disk taken on line IIB—IIB of FIG. 2A.

FIG. 2A and FIG. 2B show one disk 2 of the input disk 2 and the output disk 3 for the half toroidal type continuously variable transmission 20 as a representative of both. Both disks have essentially equivalent shapes to each other. The disk 2 has the shape of a disk symmetrical with respect to an axis P as shown in FIG. 2A.

The disk 2 comprises a protrusion 22, a skirt portion 23 and a mounting hole 27 in one body as shown in FIG. 2B. The disk 2 is projected in the central portion along the axis P as viewed from the side when the disk is mounted on the input shaft 1. The end surface 22a of the protrusion 22 is formed circular when viewed from the front, as shown in FIG. 2A and is a plane extending along a direction perpendicular to the axis P when viewed from the side, as shown in FIG. 2B.

The skirt portion 23 is provided outside the periphery of the protrusion 22 and a thickness of the disk 2 is gradually thinner along a direction from the protrusion 22 toward its outer edge. In the example of the figure, the skirt portion 23 has its thinnest portion 23a at a position toward the axis P in the vicinity of the outer peripheral surface 25 of the disk 2.

The mounting hole 27 is formed in the central portion the disk 2 and in the protrusion 22. The mounting hole 27 penetrates along the axis P through the disk 2. The mounting hole 27 is formed circular when viewed from the front, as shown in FIG. 2A. The mounting hole 27 has a shape that an inner diameter is constant throughout the total depth from the end surface 22a to the bottom surface 24 along the axis P. The mounting hole 27 accommodates the input shaft 1 through the inside of the hole when the disk 2 is mounted on the input shaft 1.

The bottom surface 24 located on the rear side to the end surface 22a of the disk 2 is formed as a plane extending along a direction perpendicular to the axis P. The outer peripheral surface 25 is formed as a cylindrical surface in parallel to the axis P.

The disk 2 is provided with a traction surface 26 over the side of the protrusion 22 and the skirt portion 23 as shown in FIG. 2B. The traction surface 26 is formed in the shape of an arc, in section including the axis P, whose center coincides with the axis of the shaft 7. The traction surface 26 is formed along the entire periphery of the disk 2. The traction surface 26 is put in contact with the power roller 10.

In a section of the disk 2 including the axis P, as shown in FIG. 2B, a line segment F and a prolonged line G from the end surface 22a in a direction from its center to its outer periphery forms an angle δ, wherein the line segment F passes through a point β at which a line segment Pa extending along the axis P from the center α of the curvature of the traction surface 26 intersects with the traction surface 26, and a point γ on the outer periphery of the end surface 22a.

The disk 2 is manufactured through a upsetting process, a first forging process, a second forging process and a machining process, which are shown below.

A first die set 30 used in the upsetting process comprises a first die 31 as a first lower die and a second die 32 as a first upper die each formed in the shape of a cylinder, as shown in FIGS. 4A, 4B. The first die 31 and the second die 32 are used for forging a work W as a first material along the axis Q of the work W from both ends thereof, wherein the work W is preformed in the shape of a rod made of a metal as base material for the disk 2.

The work W is preformed as a solid base material mass in a near cylindrical shape, the diameter D of which cylinder is almost constant along the axis Q, after a manufacturing process such as forging. For this reason, the work W has a metal flow in the bulk, which is formed along the axis Q. The work W in the example shown in the figure satisfies the following equation 1 with respect to a ratio between a length L and a diameter D thereof:

$$L/D \leq 2.2 \qquad \text{(Equation 1).}$$

The first die 31 has an end surface 31a as a first plane portion which is almost flat. The end surface 31a has a first recess 34 as a retaining portion thereon. The first recess 34 as a first circular recessed portion assumes a circular shape with almost the same diameter as a diameter D of the work W. The first recess 34 supports the work W in such a manner that the axis Q is approximately perpendicular to the end surface 31a.

The second die 32 has a second recess 33 as a retaining portion on an end surface 32a which is put in contact with the work W when the work W is forged. The second recess 33 as a second tapered recessed portion is formed so as to be withdrawn from the end surface 32a. The second recess 33 has a flat bottom surface 35 whose plane is perpendicular to the axis Q of the work W positioned in place on the first die 31. The bottom surface 35 as a second plane portion of the second recess 33 is shaped as a circle whose diameter is approximately same as the diameter D of the work W.

The second recess 33 has a slope 36 between the end surface 32a and the bottom surface 35 of the second die 32 and the slope 36 is formed in such a manner that an opening diameter thereof is gradually decreased from the end surface 32a toward the bottom surface 35. The slope 36 is used as a protrusion molding portion. The second recess 33 has an inner profile in conformity with the outer profile of the protrusion 22 of the disk 2 with the exception that the inner size of the second recess 33 is a larger than the actual size of the protrusion 22. The slope 36 inclines with an angle θ to a prolonged line K extending from its center to its outer periphery on the bottom surface 35 and the angle θ satisfies the relation with the angle δ of the following equation 2:

$$\theta = \delta \pm 10° \text{ (degrees)} \quad \text{(Equation 2)}.$$

A center 34a of the first recess 34 and a center 35a of the bottom surface 35 are both in alignment with the axis Q of the work W.

The second die set 37 used in the first forging process comprises a second lower die 71 and a second upper die 72. The second lower die 71 comprises a third die 38 and a first outer die 40. The second upper die 72 comprises a fourth die 39 and a first inner die 41 as a hole molding portion which is fixed to the fourth die 39 as shown in FIGS. 5A, 5B.

The third die 38 is formed as a cylindrical shape which has the same diameter as an outer diameter D1 of the work W (W1) as a second material after the upsetting process. The third die 38 has an end surface 38a as a third plane portion which is approximately perpendicular to the axis Q (Q1) of the work W (W1) when the work W (W1), which has received the upsetting, is positioned in place on the end surface 38a of the third die 38.

The third die 38 has a first protrusion 42 as a retaining portion almost in the central portion of the end surface 38a. The first protrusion 42 as a first projection portion is projected from the end surface 38a toward the work W (W1). The first protrusion 42 is formed in a shape such that a surface 42a, which is put in contact with the work W (W1), is a plane in parallel to the end surface 38a and that a section thereof is a circle and a diameter thereof is a little smaller than the actual inner diameter of the mounting hole 27.

The first protrusion 42 is tapered toward the work W (W1).

The fourth die 39 has a cylindrical portion 43 on the surface opposed to the work W (W1). The cylindrical portion 43 is formed so as to have almost the same diameter as the outer diameter of the third die 38. The cylindrical portion 43 has a third recess 44 as a retaining portion on the end surface 43a which is put in contact with the work W (W1). The third recess 44 as a third tapered recessed portion is formed so as to have almost the same shape as the second recess 33 provided on the end surface 32a of the second die 32.

The fourth die 39 has a bottom surface 44a as a fourth plane portion. The bottom surface 44a is perpendicular to an axis Q (Q1) of the work W (W1) and having a diameter equal the diameter of the bottom surface 35. The third recess 44 is located outside of the bottom surface 44a.

The first outer die 40 envelops the outer periphery of the third die 38. The end surface 40b of the first outer die 40 is projected from the end surface 38a of the third die 38 toward the side where the work W (W1) is positioned. The inner surface 40a as a first outer portion of the first outer die 40 functions as a retaining portion. The inner surface 40a of the first outer die 40 is formed not only as a cylindrical surface in parallel to the axis Q (Q1) of the work W (W1) but as the inner surface of an annular ring enveloping the outer peripheral surface of the work W (W1).

The first inner die 41 is formed as a round rod whose diameter is a little smaller than the inner diameter of the mounting hole 27 of the input and out put disks 2 or 3. The first inner die 41 is fixed to the fourth die 39 in such a manner that an end portion 41a thereof is projected from the bottom surface 44a of the third recess 44 toward the work W (W1). The first inner die 41 is fixed to the fourth die 39 in such a manner that the axis O thereof is aligned with the axis Q (Q1). The end portion 41a of the first inner die 41 is formed so that the portion is gradually tapered toward its fore end.

The third die set 45 used in the second forging process comprises a third lower die 73 and a third upper die 74. The third lower die 73 comprises a fifth die 46 and a second outer die 48. The third upper die 74 comprises a sixth die 47 and a second inner die 49 fixed to the sixth die 47 as shown in FIGS. 6A, 6B.

The fifth die 46 is formed as a cylindrical shape whose diameter is larger than the outer diameter of the third die 38. The end surface 46a as a fifth plane portion of fifth die 46 is formed as a plane which is perpendicular to the axis Q (Q2) of the work W (W2) as a third material when the work W (W2) is positioned in place on the end surface 46a after the first forging process. The fifth die 46 is provided with a second protrusion 50, as a retaining portion in the central portion of the end surface 46a. The second protrusion 50 as a second projecting portion is formed so as to assume the same shape as the first protrusion 42 of the third die 38.

The sixth die 47 is formed as a cylindrical shape whose diameter is a larger than the outer diameter of the fifth die 46. The sixth die 47 is provided with a fourth recess 51 as a fourth recessed portion in the central portion of the end surface 47a which is put in contact with the work W (W2). The fourth recess 51 is formed so as to be withdrawn from the end surface 47a. The fourth recess 51 has an inner profile so as to be a larger in size than the protrusion 22 while keeping almost in conformity with the outer actual profile of the protrusion 22 along the entire thickness.

The sixth die 47 has a convexly curved surface 52 as a forming raw traction surface for forming a skirt portion, which surface is located in an area from the fourth recess 51 to the end surface 47a in the peripheral portion of the fourth recess 51. The curved surface 52 is formed along the traction surface 26 of the disk 2 in corresponding manner. The sixth die 47 has a bottom surface 51a. The bottom surface 51a is perpendicular to an axis Q (Q2) of the work W (W2). The curved surface 52 is located outside of the bottom surface 51a and formed into concave arc.

The second outer die 48 envelops the outer periphery of the fifth die 46. The end surface 48a of the second outer die 48 is projected from the end surface 46a of the fifth die 46 toward the side where the work W (W2) is positioned.

The second outer die 48 is provided with a step portion 53 on an inner surface 48b as a second outer portion. The step portion 53 is located between the end surface 46a of the fifth die 46 and the end surface 48a of the second outer die 48. The second outer die 48 is formed in such a manner that an inner diameter on the side where the work W (W2) is positioned with respect to the step portion 53 is almost same as the outer diameter of the sixth die 47. According to the above described construction, the sixth die 47 can be freely inserted into the second outer die 48. The sixth die 47 is, besides, allowed to have a gap 75 between the end surface 47a and the step portion 53 when the sixth die 47 is inserted into the second outer die 48.

The second inner die 49 is formed so as to assume almost the same shape as the first inner die 41. The second inner die 49 is fixed to the sixth die 47 in such a manner that an end portion 49a thereof is projected from the bottom surface 51a of the fourth recess 51 toward the work W (W2) side. The second inner die 49 is fixed to the sixth die 47 in such a manner that the axis O1 thereof is approximately aligned with the axis Q (Q2).

Then, manufacturing processes of the above described disk 2 will be described in reference to FIGS. 3 to 9. In step S1 shown in FIG. 3, the work W is heated to a temperature which is suitable for forging and at which the work W can be subject to deformation by means of a well known heating device such as an induction heater.

Figure 3:
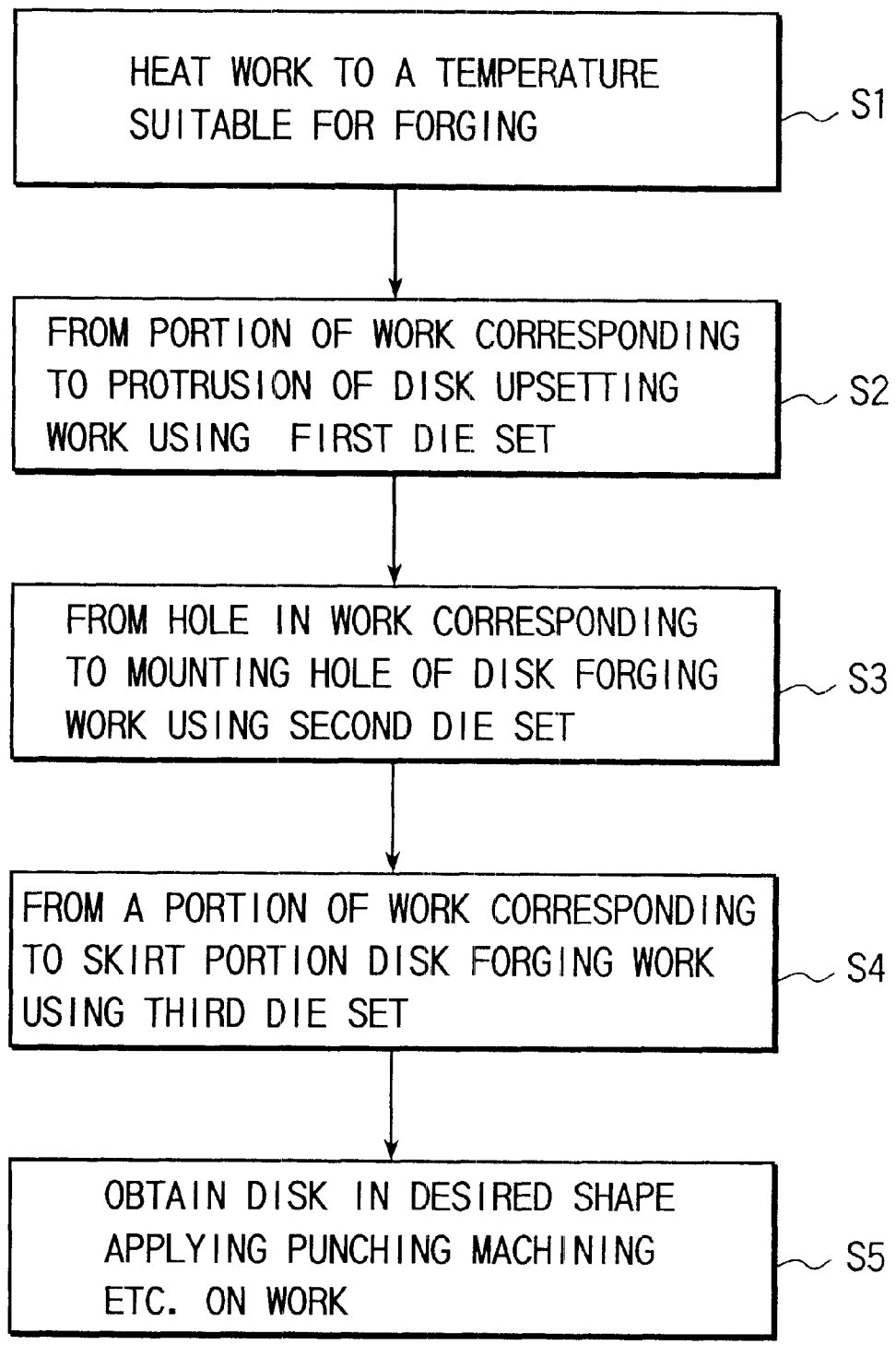
FIG. 3 is a flow chart showing an example of a manufacturing process of the disk shown in FIGS. 2A and 2B.

Then, in step S2 shown in FIG. 3, the upsetting process which will be shown below is performed. In the upsetting process, first of all, as shown in FIG. 4A, the work W as a first material is positioned in place by being fittingly inserted in the first recess 34 of the first die 31. The first die 31 and the second die 32 are moved toward each other along the axis Q so that the bottom surface 35 of the second recess 33 is put in contact with the work W.

Thereafter, the work is forged by moving the dies 31 and 32 further closely to each other along the axis Q. As shown in FIG. 4B, the work W (W1) as a second material is molded into a shape in conformity with the bottom surface 31a of the first die 31 and the second recess 33 of the second die 32.

At this point, the work W (W1) has been forged so as to have a portion 57 as a raw protrusion corresponding to the protrusion 22 of the disk 2 in conformity with the inner profile of the second recess 33 and at the same time, the outer appearance of the work W (W1) assumes a disk-like shape in which an outer diameter thereof is expanded between the dies 31 and 32. Besides, the work W (W1) is forged by moving the dies 31 and 32 closely to each other in a manner such that the outer diameter D1 (shown in FIG. 4B) of the work W (W1) is almost equal to the inner diameter D2 of the inner diameter of the first outer die 40 (shown in FIG. 5A).

In the step, since positioning is performed by the first recess 34 and the slope 36 of the second recess 33 and the like, the work W (W1) is never deviated with eccentricity from the right position between the dies 31 and 32.

After completion the upsetting process, in step S3 the first forging process which will be described below is performed. First of all in the first forging process, the work W (W1) is, as shown in FIG. 5A, positioned in place on the end surface 38a of the third die 38 inside of the first outer die 40 of the second die 37.

At this point, the work W (W1), since the diameter D1 of the work W (W1) is controlled to be almost equal to the inner diameter D2 of the first outer die 40 in the upsetting process, neither looseness nor play arises between the work W (W1) and the first outer die 40. The work W (W1) is positioned in place so that the axis Q (Q1) assumes a position along a direction perpendicular to the end surface 38a of the third die 38. Besides, the bottom surface 54 of the work W (W1) is put in contact with the end surface 42a of the first protrusion 42.

The work W (W1) is forged while the dies 38 and 39 are moved more closely to each other along the axis Q (Q1). As shown in FIG. 5B, the work W (W2) is molded into a shape in conformity with the end surface 38a of the third die 38, the protrusion 42 and the first inner die 41.

At this point, a hole 55 as a raw mounting hole corresponding to the mounting hole 27 of the disk 2, whose inner profile is in conformity with the outer profile of the first inner die 41 is formed in the work W (W2) as a third material. A recess 56, which is fittingly engaged with the first protrusion 42, is formed on the bottom surface 54 of the work W (W2) and thus the bottom surface 54 is put into contact with the end surface 38a of the third die 38 with no gap.

The work W (W2) is positioned in place so as not to be displaced from the right position with an eccentricity. In the process, the hole 55 corresponding to the mounting hole 27 which is formed in the process does not penetrate through the work W (W2).

After completion of the first forging process, in step S4 shown in FIG. 3, the second forging process which will be described below is performed. First of all in the second forging process, the work W (W2) is positioned in place inside the second outer die 48 of the third die set 45 on the end surface 46a of the fifth die 46 of the third die set 45, shown in FIG. 6A.

At this point, since the recess 56 formed on the bottom surface 54 in the first forging process is fittingly engaged with the second protrusion 50, the work W (W2) is positioned in place so that the axis Q (Q2) assumes a position along a direction perpendicular to the bottom surface 46a of the fifth die 46.

The work W (W2) is forged by moving the dies 46 and 47 closely toward each other along the axis Q. As shown in FIG. 6B, the work W (W2) is molded into a shape of the work W (W3) corresponding to the convexly curved surface 52 of the sixth die 47.

At this point, the work W (W3) is molded in such a manner that a portion 58, a portion 59 and a burr 60 are included in one body, wherein the portion 58 as a raw traction surface corresponds with the traction surface 26, whose profile is in conformity with the curved surface 52 of the sixth die 47; the portion 59 corresponds with the skirt portion 23, which is molded so that an outer diameter thereof is expanded between the dies 46 and 47; and the burr 60 is projected in a direction toward the outer periphery between the step portion 53 of the second outer die 48 and the sixth die 47.

In step S5, a disk 2 in the desired shape is obtained by performing processes of punching and cutting as shown in the following manner. First of all, the work W (W3) which has been applied with the second forging process shown in FIG. 7 is subjected to a punching process. As shown in FIG. 8, the work W (W4) is formed into such a shape that the burr 60 has been removed and the hole 55 (55a) has been opened to communicate through.

Thereafter, as shown in FIG. 9, the work W (W4) is subjected to a machining process over the whole body which is shown with a two-dot chain line S' after the punching and thus the work W (W5) is obtained in the shape corresponding to the disk 2 of the half toroidal type continuously variable transmission 20 as shown with a solid line T in the figure.

Then, the work W (W5) is further subjected to a carburizing process or a carbonitriding process, which is more desired, and the whole body is further subjected to machining process to necessary precision to order to manufacture the disk 2 for the half toroidal type continuously variable transmission 20.

A method of manufacturing a disk 20 for a half toroidal type continuously variable transmission 20 employs, in the processes in which the work W in the shape of a rod as a base material mass, mainly the first die set 30 for molding the portion 57 corresponding to the protrusion 22 of the disk 2; mainly the second die set 37 for molding the hole 55 corresponding to the mounting hole 27; and mainly the third die set 45 for molding the skirt portion 23.

For this reason, mutual contacts of the work W with the respective die sets 30, 37 and 45 are short in time length and thereby, influence of heat of the work W acted on the die sets 30, 37 and 45 is reduced in each molding process. Hence, a surface hardness of each of the die sets 30, 37 and 45 which is put in contact with the work W is maintained. Accordingly, reduction in life time can be suppressed in each of the die sets 30, 37 and 45.

In addition, since the portion 57 corresponding to the protrusion 22; the hole 55 corresponding to the mounting hole 27; and the portion 59 corresponding to the skirt portion 23 are respectively formed using different die sets 30, 37 and 45 from one another, the work can be molded with no difficulty. Hence, a flow of a metal structure of the work W in each process can be performed in a smooth manner and therefore, a disk 2 which has a well balanced metal flow in its bulk can be formed. Accordingly, a disk 2 with a long lifetime can be manufactured.

Furthermore, since a smooth flow of a metal structure can be attained in each process, a force acted on each of the die sets 30, 37 and 45 in the corresponding process can be suppressed. Accordingly, breakage of the die sets 30, 37 and 45 can be prevented form occurring.

In addition, since the work is positioned in place with the help of the first recess 34, the inner peripheral surface 40a of the first outer die 40 and the protrusions 42 and 50 in the first to third forging processes, the work is not displaced from the right position in each of the die sets 30, 37 and 45 during the respective molding processes, for example, with eccentricity. Hence, high precision disks 2 and 3 can be manufactured.

Furthermore, since the input and output disks 2 and 3 are manufactured by following the first through third forging processes with the punching and machining processes, not only can higher precision input and output disks 2 and 3 be attained but precision requirement in molding the work for the first to third die sets 30, 37 and 45 can be mild.

Hence, not only forces acted on the die sets 30, 37 and 45 are suppressed, but precision requirement in molding the work is milder and the die sets 30, 37 and 45 can be used for a long time even when a wear of the die sets is in a progressed stage.

Furthermore, since in the work before the forging processes, a relation between a length L and a diameter D thereof satisfies the equation (1), the positioning of the work can be performed in the first fording process with more of certainty and at the same time, a metal flow can be formed in a symmetric manner with respect to the axis Q of the work W. Hence, a disk 2 with higher precision and with a more balanced metal flow can be obtained, which enables the disk 2 to enjoy a longer lifetime.

In such a manner, since reduction in lifetime length of the die sets 30, 37 and 45 is suppressed and the die sets 30, 37 an 45 can be used in respective stages when a wear of each die is advanced, increase in production cost for a disk 2 can be prevented for occurring.

Figure 14:
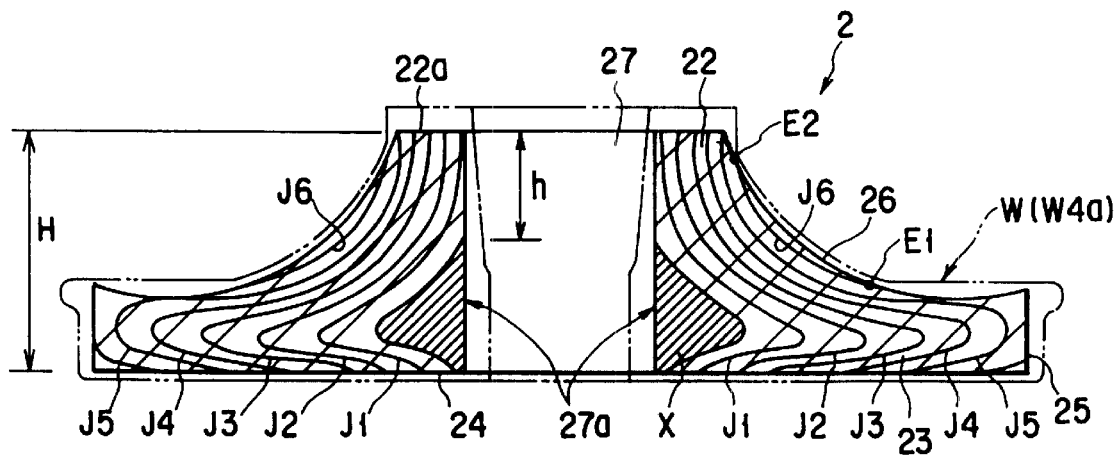
FIG. 14 is a sectional view showing a metal flow in a disk obtained by a manufacturing method of the second embodiment of the present invention.

In the process of manufacturing a disk 2 of the present invention, a base material (first material) of FIG. 4A is pressed down in the direction of the axis Q as shown in FIG. 4B. Then, the portion X that includes most of the impurities also becomes flattened. This step is followed by an upsetting step, where the inner die 41 of the second die 37 is pushed into the work W, as shown in FIG. 5B. As a result, the portion X moves towards the bottom of the work W. This bottom portion is then punched out to form a hole 55A through the steps illustrated in FIGS. 7 and 8. Finally, the inside surface of the hole 55A is machined as shown in FIG. 9, removing most of the portion X that includes most of the impurities, as shown in FIG. 14. The present invention can thereby satisfy the following $h/H \leq 0.33$.

In disk 2, a portion X of the work W that contains most of the impurities prior to the manufacturing processes is pushed out from the end surface 22a of the protrusion 22 toward the bottom surface side 24 by the first inner die 41 in the second forging process and the portion X is further removed by the punching process and the machining process shown in FIGS. 7 and 8 to almost nothing. Accordingly, a long lifetime disk 2 can be manufactured.

FIGS. 10A to 13 show a second embodiment. The same constituents as those of the first embodiment and the same steps as those thereof are indicated by the same marks and related description is omitted. In the embodiment, the sixth die 47 of the third die set 45 used in the second forging process, the end surface 47a thereof has a flat surface 61. The flat surface 61 is disposed in an abutting manner on and outside the outer periphery of the curved surface 52. The flat surface 61 is formed as a plane perpendicular to the axis O1 and Q (Q2). The flat surface 61 covers the end surface 47a of the sixth die 47 all the periphery thereof.

Figure 10A:
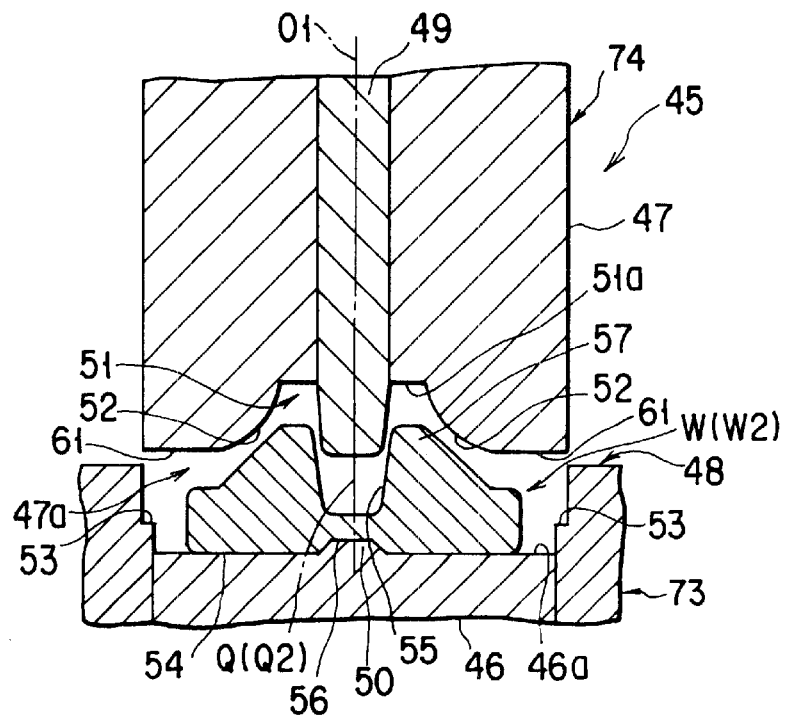
FIG. 10A is sectional views showing a work before the third forging process and a third die set in a second embodiment of the present invention.
Figure 10B:
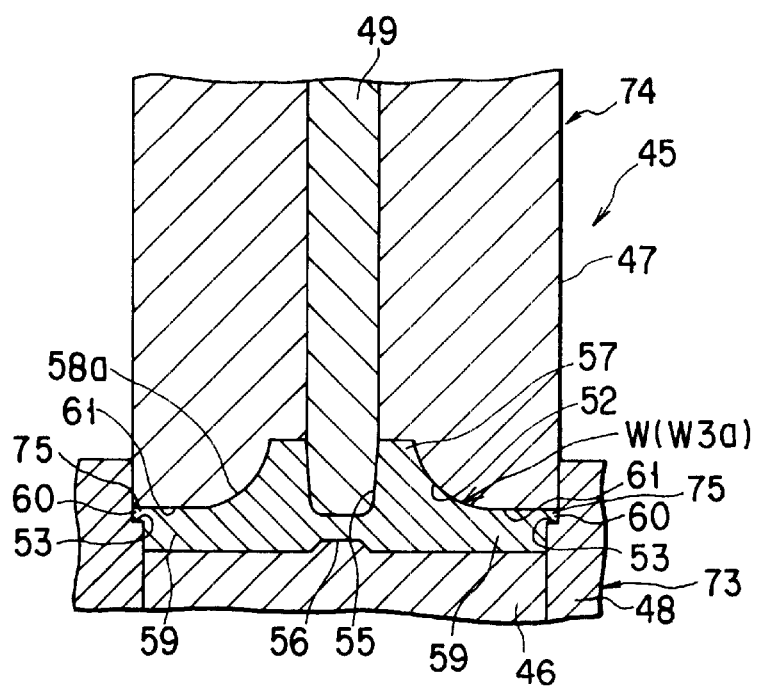
FIG. 10B is sectional views showing a work after the third forging process and the third die set in the second embodiment of the present invention.

In the embodiment, the work W (W2), which has received the upsetting process shown in FIGS. 4A and 4B and the first forging process shown in FIGS. 5A and 5B as in the first embodiment, is further subjected to the second forging process shown in FIGS. 10A and 10B.

In the second forging process, the work W (W3) on which a portion 58*a* as a raw traction surface corresponding to the traction surface 26 has been formed is obtained. The portion 58*a* corresponding to the traction surface 26 is present along the curved surface 52 and the flat surface 61. The work W (W3) is further subjected to the punching process and the machining process going through steps shown in FIGS. 11 to 13 to form the work W (W4*a*, W5*a*). Thus, the disk 2 for the half toroidal type continuously variable transmission 20 can manufactured.

According to the embodiment, in addition to the effects of the first embodiment, since the flat surface 61 is formed on the end surface 47*a* of the sixth die 47, a cost of the sixth die 47 can be suppressed. Increase in production cost can, accordingly, further be suppressed.

Besides, since a flow of a metal structure of the work in the upsetting, first and second processes can be smoother, forces acted on the die sets 30, 37 and 45 in the processes can be suppressed.

Figure 11:
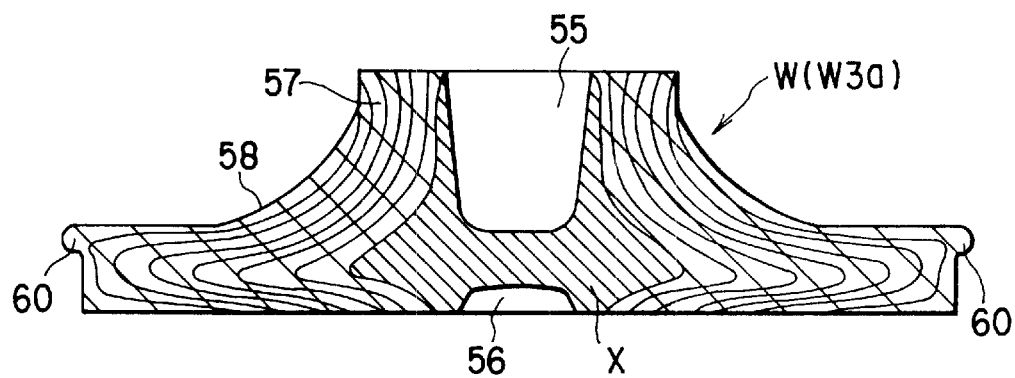
FIG. 11 is a sectional view showing the work after completion of the third forging process shown in FIGS. 10A and 10B.
Figure 12:
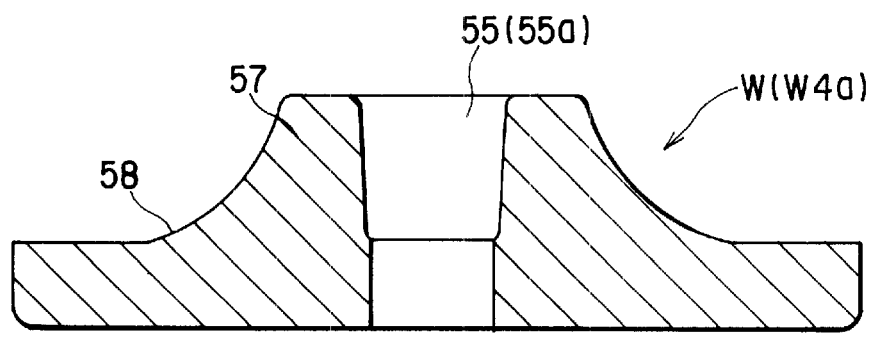
FIG. 12 is a sectional view showing a state after punching the work shown in FIG. 11.
Figure 13:
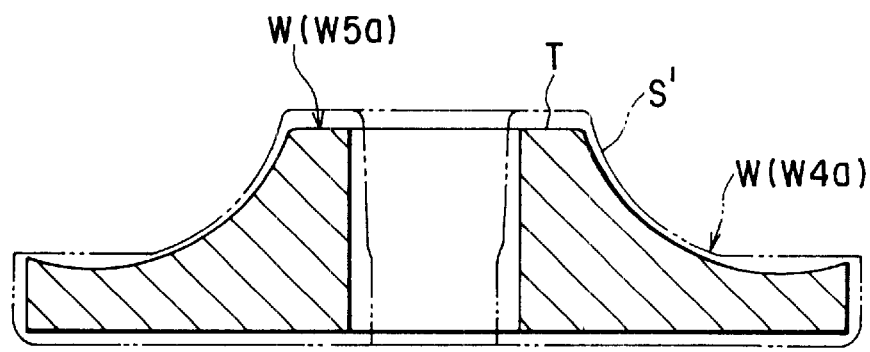
FIG. 13 is a sectional view showing a state after cutting the work shown in FIG. 12.

In the disk 2 manufactured by the method of the embodiment, the densely hatched portion X of FIG. 11, which is part of 30% or less of the outer diameter of the work around the central portion thereof before the manufacturing processes is pushed out by the first inner die 41 from the end surface 22*a* of the protrusion 22 toward the bottom surface 24 side and the portion X is further removed to almost nothing by the punching process, the machining process and the like shown in FIGS. 12, 13 and the like.

by the second embodiment shown in FIG. 14, metal flows are formed in the bulk as shown by the solid lines J1 to J6 in FIG. 14.

Besides, the portion X in which much of impurities is included, too, is not present on the end surface 22*a* of the protrusion 22 but only part thereof is present on the bottom surface 24. Accordingly, the manufacturing method shown in the first embodiment can also attain a disk 2 with a long lifetime.

What have been described above are apparent from results in endurance tests shown in Table 1 below.

Figure 17:
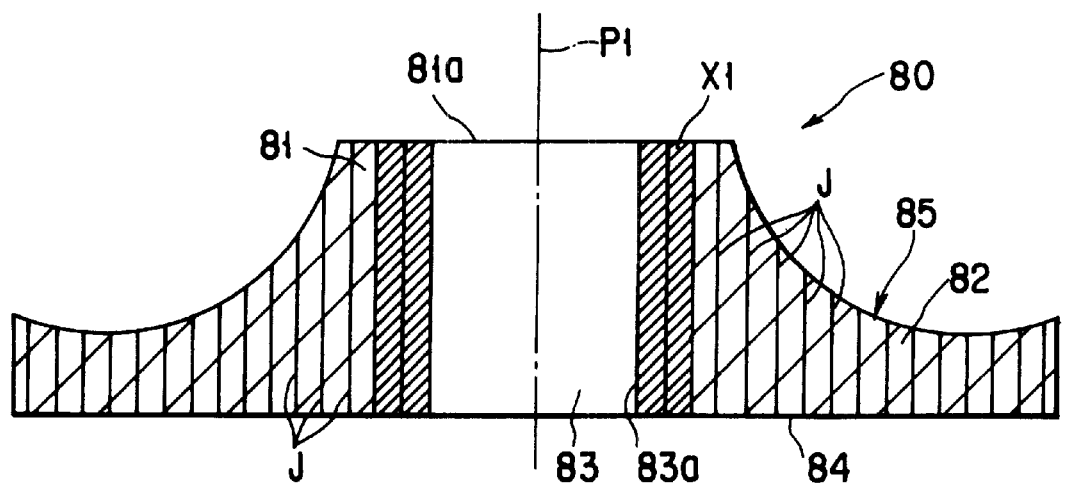
FIG. 17 is a sectional view showing a metal flow in a disk for a half toroidal type continuously variable transmission obtained by a conventional manufacturing method.

The endurance tests shown in Table 1 are tests on disks 80 manufactured by a conventional method such as machining or the like shown in FIG. 17 and disks 2 manufactured through the upsetting process to the second forging process, wherein a plurality of disks were manufactured and provided as test pieces A to H.

In Table 1, the test pieces A and B are disks 80, which were manufactured by the conventional method, and which respectively had the portions X1 containing much of impurities on the inner surface 83*a* of the mounting hole 83. The test pieces C to H are disks 2, which were manufactured through the upsetting to second forging processes, and which had different ratios of h/H, wherein h is a distance of the portion X, containing much of impurities on the inner surface 27*a* of the mounting hole 27, from the end surface 22 and H is a thickness of the protrusion 22, that is a distance from the end surface 22*a* to the bottom surface 24 (see FIG. 14).

TABLE 1

Endurance Test Results on Disks Manufactured by Different Methods

| test piece Nos. | main manufacturing method | h/H(%) | test results | judgments |
| --- | --- | --- | --- | --- |
| test piece A | machining | — | fracture from end surface of protrusion on inner surface of mounting hole after 68 hr | X |
| test piece B | machining | — | fracture from end surface of protrusion on inner surface of mounting hole after 59 hr | X |
| test piece C | forging | 15 | fracture from end surface of protrusion on inner surface of mounting hole after 171 hr | X |
| test piece D | forging | 22 | fracture from end surface of protrusion on inner surface of mounting hole after 211 hr | X |
| test piece E | forging | 34 | no fracture after 250 hr | ○ |
| test piece F | forging | 41 | no fracture after 250 hr, | ○ |
| test piece G | forging | 53 | no fracture after 250 hr | ○ |
| test piece H | forging | 51 | no fracture after 250 hr | ○ |

Not only do metal flows J1 to J6 arise in the disk 2 as shown in FIG. 14 but the portion X is not present on the end surface 22 of the protrusion 22 with exception that only part of the portion X is present on the bottom surface 24. Accordingly, since there is no portion X which contains much of impurities is present on the end surface 22*a* of the protrusion 22 on which an especially larger stress acts, the disk 2 with a long lifetime can be manufactured.

In addition, the disk 2 molded by the manufacturing method shown in the first embodiment, too, as that obtained According to the results of Table 1, in the cases of the test pieces E to H having the ratio h/H of more than 33%, the endurance tests were performed for 250 hours but it was apparent that no fractures arise.

On the other hand, in the cases of the test pieces which have portions X containing much of impurities on the end surfaces 22*a* of the protrusions 22, as is the cases of test pieces A to D, it was apparent that fractures arose starting from the end surfaces 22a on the inner surface 27a of the mounting holes 27 in relatively short time after start of the tests.

From such results, it was apparent that when a portion X containing much of impurities was kept out from the end surface 22a of the protrusion 22 on the inner surface 27a of the mounting hole 27 and only allowed to be present on the bottom surface 24, a disk 2 with a long lifetime was able to be attained.

The portion X is desirably does not exist in a position so as to satisfies a ratio h/H of 33% or less and in this case, it was apparent that a disk 2 which had a long lifetime without fail was able to be attained.

Figure 15:
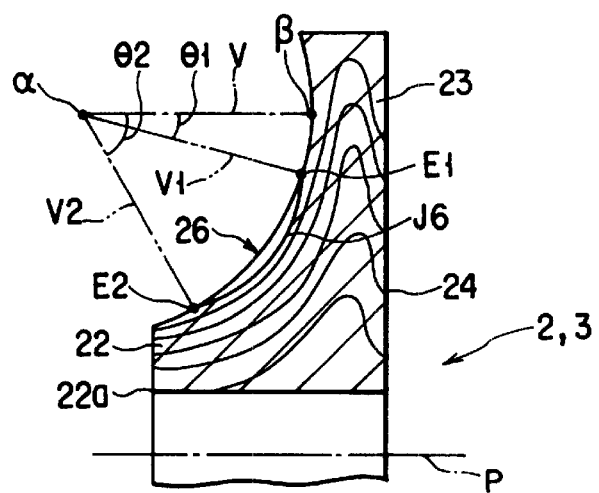
FIG. 15 is a sectional view showing ends of metal flows on a traction surface of the disk shown in FIG. 14.

A disk 2 which is manufactured by the method shown in the second embodiment has a chance that ends E1 and E2 of metal flows on the traction surface 26 as shown FIGS. 14 and 15 arise.

When the metal flow ends E1 and E2 arise on the traction surface 26, it is desirable that the flat end surface 61 of the sixth die 47 is formed so that end flows E1 and E2 of metal flows does not exist in an angular range of 15 to 60 degrees in θ1 and θ2, wherein the angles θ1 and θ2 are respectively those formed between line segments V1 and V2 and a line segment V; the line segments V1 and V2 being those between the center α of a curvature of the traction surface 26 and the metal flow ends E1 and E2, and the line segment V being that passes the curvature center α of the traction surface 26 in parallel to the axis P.

This is also apparent from results of endurance tests shown in Table 2. The endurance tests whose results are shown in the Table 2 employed a plurality of test pieces A to N which were prepared by ways in which an area of the flat surface 61 of the sixth die 47 was changed so that metal flow ends E1, E2 arose at positions with different angles θ1 and θ2.

outer periphery of the disk 2, were fractured within 250 hours of a test time.

Besides, it was apparent that the test pieces A, D E, H and I, each of which had a metal flow end E2 located at a position whose angle θ2 was 60 or less degrees near the protrusion 22 of the disk 2, were fractured within 250 hours of a test time.

Furthermore, it was apparent that the test pieces B, C, F, G and J, each of which had no metal flow end, neither E1 nor E2, in the range of 15 to 60 degrees in θ1 or θ2, were not fractured even when a test time was elapsed 250 hours.

Accordingly, it was apparent that when a disk 2 was manufactured so that neither the end flows E1 nor E2 arose in the range of 15 to 60 degrees in θ1 and θ2 by adjusting an area of the flat surface 61 of the sixth die 47, the disk 2 with a long lifetime was able to be manufactured.

Figure 16:
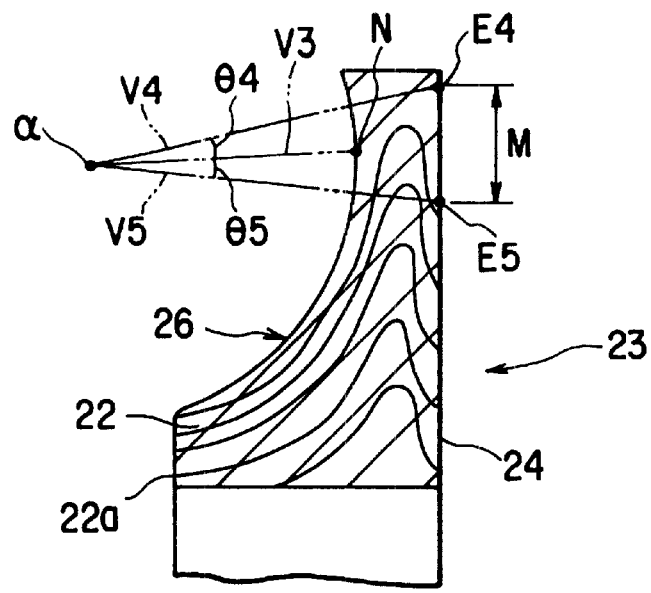
FIG. 16 is a sectional view showing ends of metal flows on a bottom surface of the disk shown in FIG. 14.

Besides, on the bottom 24 side of a disk 2, it is desirable that an end flow of a metal flow is not located in the angular range, about the center of a curvature, of ±10° (degrees) of a line segment V3 which corresponds to a length M (see FIG. 16) on the bottom surface 24 by adjusting an area of the flat surface 61 and the like of the sixth die 47, wherein the line segment V3 is that between the center α of the curvature of the traction surface 26 and a contact point N (see FIG. 16) at which the power roller 10 contacts with the traction surface 26 at the maximum decrease in speed or the maximum increase in speed.

This is apparent from results of endurance tests shown in Table 3 as well. The endurance tests whose results are shown in the Table 3 employs test pieces A to L which was prepared by ways in which an area of the flat surface 61 and the like of the sixth die 47 is changed and thereby angles θ4 and θ5, which are respectively formed between V3 and V4, and V3 and V5, are changed to assume different values from one another, wherein the line segments V4, V5 are those between

TABLE 2

Endurance Test Results on Disks with Traction Surfaces having Different Metal Flow End Positions thereon

| test piece Nos. | φ 1 (degree) | φ 2 (degree) | test results | judgments |
|---|---|---|---|---|
| test piece A | 0 | 56 | fracture after 112 hr | X |
| test piece B | 0 | 69 | no fracture after 250 hr | ◯ |
| test piece C | 3 | 63 | no fracture after 250 hr | ◯ |
| test piece D | 7 | 45 | fracture after 97 hr | X |
| test piece E | 9 | 42 | fracture after 198 hr | X |
| test piece F | 9 | 65 | no fracture after 250 hr | ◯ |
| test piece G | 11 | 64 | no fracture after 250 hr | ◯ |
| test piece H | 12 | 53 | fracture after 120 hr | X |
| test piece I | 13 | 41 | fracture after 182 hr | X |
| test piece J | 14 | 62 | no fracture after 250 hr | ◯ |
| test piece K | 18 | 70 | fracture after 170 hr | X |
| test piece L | 19 | 62 | fracture after 195 hr | X |
| test piece M | 20 | 65 | generation of vibrations and cracks on traction surface after 203 hr | X |
| test piece N | 25 | 63 | generation of vibrations and cracks on traction surface after 215 hr | X |

According to Table 2, it was apparent that the test pieces K to N, each of which had a metal flow end E1 located at a position whose angle θ1 was 15 or more degrees near the the curvature center α and respective end flows of metal flows, E4, E5, which are the closest ones on the bottom surface 24 to the contact point N.

TABLE 3

Endurance Test Results on Disks with Bottom Surfaces having Different Metal Flow End Positions thereon

| test pieces | φ 4 (degree) | φ 5(degree) | test results | judgments |
| --- | --- | --- | --- | --- |
| test piece A | −10 | 30 | fracture after 108 hr | X |
| test piece B | −3 | 27 | fracture after 168 hr | X |
| test piece C | 2 | 25 | generation of cracks on bottom surface after 176 hr | X |
| test piece D | 8 | 20 | generation of cracks on bottom surface after 198 hr | X |
| test piece E | 11 | 16 | no fracture after 250 hr | ○ |
| test piece F | 12 | −2 | fracture after 118 hr | X |
| test piece G | 12 | 0 | fracture after 152 hr | X |
| test piece H | 12 | 8 | generation of cracks on bottom surface after 224 hr | X |
| test piece I | 12 | 11 | no fracture after 250 hr | ○ |
| test piece J | 12 | 15 | no fracture after 250 hr | ○ |
| test piece K | 12 | 20 | no fracture after 250 hr | ○ |
| test piece L | presence of metal flow ends over entire bottom surface | presence of metal flow ends over entire bottom surface | fracture after 72 hr | X |

According to Table 3, it was apparent that the test pieces A to D in each of which an end flow E4 was located at a position with the angle θ4 of 10° or less near the outer periphery of a disk 2 were fractured within 250 hours of a test time.

Besides, it was apparent that the test pieces F to H in each of which an end flow E4 was located at a position with the angle θ5 of 10° or less near the protrusion 22 of a disk 2 were fractured within 250 hours of a test time.

Furthermore, it was apparent that any of the test pieces E, I, J and K, in which end flows E4 and E5 were respectively located at positions with the angles θ4 and θ5 more than 10°, was not fractured even after 250 hours of a test time were elapsed.

Accordingly, it was apparent that when the flat surface 61 of the sixth die 47 is formed so that an end flow of a metal flow was not located in the range M corresponding to ±10° of a line segment V3 passing through the curvature center a on the bottom surface 24, a disk 2 with a long lifetime was able to be obtained.

In such a manner, according to a method of manufacturing a disk 2 for a half toroidal type continuously variable transmission 20, a disk 2 with a long lifetime can be obtained by removing a portion X containing much of impurities included in a work W before the processes therefrom.

Besides, a disk 2 with high precision in which a balance on flows of metal structure and the like is achieved with no reduction in lifetime of the die sets 30, 37 and 45 and at the same time, not only can fractures in the die sets 30, 37 and 45 be prevented from occurring but the die sets 30, 37 and 45 can be kept to be used even when a wear is advanced on each of the die sets. Hence, costs for the die sets are suppressed and increase in production cost is thereby suppressed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A toroidal continuously variable transmission comprising:

an input shaft rotated by a driving source;

a input disk supported on the input shaft;

a output disk supported on the input shaft and opposed to the input disk;

a power roller swingably provided between the input disk and the output disk and rotatably put in contact with both disks; and a compression device having a cam disk supported on the input shaft, wherein at least one of the input disk and the output disk is machined to provide it with a protrusion which has an end surface and which projects in a central portion thereof along the axis; a bottom surface located on the rear side of the end surface of the protrusion; and a traction surface which is put in contact with the power roller;

wherein a reference line (V) extends through a center (α) of a curvature of the traction surface along the axis, a first line segment (V1) extends through the center (α) of curvature of the traction surface at an angle (θ1) of 15° with respect to the reference line (V), a second line segment (V2) extends through the center (α) of curvature of the traction surface at an angle (θ2) of 60° with respect to the reference line (V), and wherein an end of a metal flow does not exit on the traction surface between the first line segment (V1) and the second line segment (V2); and wherein an end of a metal flow on the bottom surface of the disk does not exist in a region defined by two lines extending from a center (α) of curvature of the traction surface and diverging in opposite directions from a line segment (V3) at an angle of +10° and −10°, respectively, said line segment (V3) extending between the center (α) and a point (N) where the power roller contacts the traction surface at the time of maximum deceleration or maximum acceleration.

2. A toroidal continuously variable transmission comprising:

an input shaft rotated by a driving source;

a input disk supported on the input shaft;

a output disk supported on the input shaft and opposed to the input disk;

a power roller swingably provided between the input disk and the output disk and rotatably put in contact with both disks; and a compression device having a cam disk supported on the input shaft;

wherein at least one of the input disk and the output disk is machined to provide it with a protrusion projected along an axis thereof in the central portion which has an end surface, a bottom surface located on the rear side of the end surface of the protrusion, a traction surface which is put in contact with the power roller, and a mounting hole formed by plastic working penetrating through the protrusion along the axis;

wherein a portion of the base material of at least one of the disks, containing most of the impurities and defined by a diameter that is 30% or less of an outer diameter of the base material of the disk before manufacturing processes, does not exist on a part of an inner surface of the mounting hole, that part of the inner surface of the mounting hole extends a distance h from an end surface of the protrusion, and the protrusion of a disk having a thickness in an axial direction defined as H such that the relationship of $h/H \leq 0.33$ is satisfied; and said portion containing the impurities exists on parts of the inner surface of the mounting hole where the relationship of $h/H > 0.33$ is satisfied.

3. A toroidal continuously variable transmission according to claim 2, wherein a reference line (V) extends through a center ($\alpha$) of a curvature of the traction surface along the axis, a first line segment (V1) extends through the center ($\alpha$) of curvature of the traction surface at an angle ($\theta$1) of 15° with respect to the reference line (V), a second line segment (V2) extends through the center ($\alpha$) of curvature of the traction surface at an angle ($\theta$2) of 60° with respect to the reference line (V), and wherein an end of a metal flow does not exit on the traction surface between the first line segment (V1) and the second line segment (V2).

4. A toroidal continuously variable transmission according to claim 2, wherein an end of a metal flow on the bottom surface of the disk does not exist in a region defined by two lines extending from a center ($\alpha$) of curvature of the traction surface and diverging in opposite directions from a line segment (V3) at an angle of +10° and −10°, respectively, said line segment (V3) extending between the center ($\alpha$) and a point (N) where the power roller contacts the traction surface at the time of maximum deceleration or maximum acceleration.

* * * * *